(12) United States Patent
Hua et al.

(10) Patent No.: US 11,988,531 B2
(45) Date of Patent: May 21, 2024

(54) SYSTEM INCLUDING AN OPTICAL WAVEGUIDE FOR EMITTING LIGHT LATERALLY AND A SENSOR FOR DETECT THE INTENSITY OF THE LATERALLY EMITTED LIGHT

(71) Applicant: SEW-EURODRIVE GMBH & CO. KG, Bruchsal (DE)

(72) Inventors: Zhidong Hua, Bruchsal (DE); Josef Schmidt, Graben-Neudorf (DE); Thomas Schäfer, Karlsdorf-Neuthard (DE); Andreas Wanjek, Waghäusel (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 292 days.

(21) Appl. No.: 16/070,469

(22) PCT Filed: Nov. 22, 2016

(86) PCT No.: PCT/EP2016/025152
§ 371 (c)(1),
(2) Date: Jul. 16, 2018

(87) PCT Pub. No.: WO2017/121453
PCT Pub. Date: Jul. 20, 2017

(65) Prior Publication Data
US 2019/0219423 A1 Jul. 18, 2019

(30) Foreign Application Priority Data

Jan. 14, 2016 (DE) ...................... 10 2016 000 224.7

(51) Int. Cl.
*G01D 5/26* (2006.01)

(52) U.S. Cl.
CPC ............... *G01D 5/26* (2013.01); *G01D 5/268* (2013.01)

(58) Field of Classification Search
CPC .. G01D 5/35335; G01D 5/35377; G01D 5/00; G01D 5/26; G01D 5/264; G01D 5/268; G01D 5/341; G01D 5/344
See application file for complete search history.

(56) References Cited

U.S. PATENT DOCUMENTS 4,239,963 A * 12/1980 August ................. G01P 15/093
250/227.14
4,672,201 A * 6/1987 Welker ............... G01D 5/34715
250/237 G (Continued)

FOREIGN PATENT DOCUMENTS

CN 1860706 A 11/2006
CN 101553712 A 10/2009

(Continued)

OTHER PUBLICATIONS

International Preliminary Report on Patentability issued in international patent application No. PCT/EP2016/025152, dated Jul. 17, 2018 (7 pages).

(Continued)

*Primary Examiner* — Michelle R Connelly
*Assistant Examiner* — Mary A El-Shammaa
(74) *Attorney, Agent, or Firm* — CARTER, DELUCA & FARRELL LLP

(57) ABSTRACT

A system includes an optical waveguide, provided as a component of a first part, and at least one sensor system, provided as a component of a second part. The second part is movable relative to the first part, and the optical waveguide radiates light laterally on the side. The sensor system detects the light intensity of the laterally emitted light (Continued)

emitted by the optical waveguide. A grating is provided between the sensor system and the optical waveguide.

15 Claims, 8 Drawing Sheets

(56) References Cited

U.S. PATENT DOCUMENTS

| | | | | |
|---|---|---|---|---|
| 5,345,076 | A * | 9/1994 | Reddy | G01D 5/26 |
| | | | | 250/226 |
| 5,535,033 | A | 7/1996 | Guempelein et al. | |
| 6,498,654 | B1 * | 12/2002 | Cusack, Jr. | G01B 11/026 |
| | | | | 250/227.17 |
| 6,563,966 | B1 * | 5/2003 | Tang | H01Q 3/2682 |
| | | | | 385/32 |
| 6,777,666 | B1 | 8/2004 | Devenyi et al. | |
| 6,965,709 | B1 * | 11/2005 | Weiss | G01F 23/292 |
| | | | | 250/361 R |
| 7,197,209 | B2 * | 3/2007 | Morel | G02B 6/29319 |
| | | | | 385/12 |
| 7,248,761 | B2 | 7/2007 | Schilling et al. | |
| 8,124,928 | B2 | 2/2012 | Villaret | |
| 8,810,791 | B2 | 8/2014 | Mutschler et al. | |
| 9,009,003 | B1 * | 4/2015 | Chan | G01D 5/35316 |
| | | | | 356/477 |
| 9,395,176 | B2 | 7/2016 | Saendig | |
| 9,874,463 | B2 * | 1/2018 | Wang | G01D 5/3473 |
| 2004/0184722 | A1 | 9/2004 | Schilling | |
| 2004/0222365 | A1 * | 11/2004 | Tobiason | G01D 5/268 |
| | | | | 250/231.13 |
| 2006/0056855 | A1 | 3/2006 | Nakagawa et al. | |
| 2008/0186491 | A1 | 8/2008 | Baxter et al. | |
| 2009/0195778 | A1 * | 8/2009 | Yankov | G01N 21/253 |
| | | | | 385/14 |
| 2010/0166433 | A1 | 7/2010 | Fujimoto et al. | |
| 2012/0321242 | A1 * | 12/2012 | Schade | G01D 5/35387 |
| | | | | 385/12 |
| 2014/0193115 | A1 * | 7/2014 | Popovic | G02B 6/124 |
| | | | | 385/14 |
| 2018/0059248 | A1 * | 3/2018 | O'Keeffe | G01S 7/4817 |
| 2019/0104471 | A1 * | 4/2019 | Nagey | G01D 9/02 |

FOREIGN PATENT DOCUMENTS

| | | | | |
|---|---|---|---|---|
| CN | 103968862 | A | 8/2014 | |
| DE | 4342778 | A1 | 6/1995 | |
| DE | 29700341 | U1 | 2/1997 | |
| DE | 10353891 | A1 | 6/2005 | |
| DE | 102012021971 | A1 | 5/2014 | |
| EP | 2650672 | A1 * | 10/2013 | G01N 21/7743 |
| EP | 2677281 | A1 | 12/2013 | |
| GB | 2169464 | A | 7/1986 | |
| JP | 2001308798 | A | 11/2001 | |
| WO | WO-2010070257 | A2 * | 6/2010 | A61B 5/015 |
| WO | WO-2012038948 | A2 * | 3/2012 | G01R 33/032 |
| WO | WO-2014198409 | A1 * | 12/2014 | G01N 21/552 |

OTHER PUBLICATIONS

International Search Report issued Mar. 2, 2017, in International Application No. PCT/EP2016/025152 (English-language translation).

European Office Action mailed from the European Patent Office and issued to counterpart Application No. 16801385.2 on Apr. 22, 2020, 11 pages.

* cited by examiner

SYSTEM INCLUDING AN OPTICAL WAVEGUIDE FOR EMITTING LIGHT LATERALLY AND A SENSOR FOR DETECT THE INTENSITY OF THE LATERALLY EMITTED LIGHT

FIELD OF THE INVENTION

The invention relates to a system, which includes a first part and a second part.

BACKGROUND INFORMATION

It is understood that optical waveguides can be used for conveying light. A lateral radiation of the light is prevented in that the surface of the optical waveguide is made as smooth as possible, i.e. not rough, so that the greatest possible portion of the light injected at the first end of the optical waveguide reemerges at the other end due to a total reflection.

German Published Patent Application No. 43 42 778 describes a contact-free data-transmission device.

German Published Patent Application No. 103 53 891 describes a system for the transmission of data between a stationary and a mobile component.

U.S. Published Patent Application No. 2010/0166433 describes an optical signal-transmission device.

U.K. Published Patent Application No. 2 169 464 describes an optical-fiber transmission system.

A device for a broadband transmission of digital optical signals between mobile units is described in U.S. Patent Application Publication No. 2004/0184722.

Japanese Published Patent Application No. 2001-308798 describes an optical waveguide having side leakage.

A rotatory encoder is described in U.S. Patent Application Publication No. 2008/0186491.

German Published Patent Application No. 10 2012 021 971 describes an optical measuring device for ascertaining angles of rotation on a rotating component.

European Published Patent Application No. 2 677 281 describes an optoelectronic sensor element.

SUMMARY

Example embodiments of present invention provide for contact-free data transmission.

According to an example embodiment of the present invention, a system includes a first part and a second part, the second part being movable relative to the first part, the first part having an optical waveguide emitting light on the side, the second part including at least one sensor system for detecting the light intensity.

This has the advantage that the light from a light source injected into the light is able to be radiated from the optical waveguide on the side and may thus be laterally radiated along the extension. A light intensity is thereby detectable by the mobile second part, and a data transmission may thus be carried out in a contact-free manner.

The sensor system may be moved along the optical waveguide when the second part is moving relative to the first part, in particular, such that light laterally emitted from the optical waveguide impinges upon the sensor system. This is considered advantageous insofar as the second part is able to be moved along the extension of the optical waveguide. In other words, the extension is a circle or an elongated trajectory in this case, e.g., a line or a circular path, whose trajectory diameter is much larger than the diameter of the cross-section of the optical waveguide. In this manner, a data transmission is therefore able to be carried out in a contact-free manner during the movement, and additionally or alternatively, a position may be determined as well.

The first part may have a grating, which is situated between the sensor system and the optical waveguide. This offers the advantage that the openings of the grating may be spaced apart at regular intervals, so that the traveled distance is able to be determined from the number of the detected light-intensity maxima during the movement. Because of the irregularly disposed grating openings in relation to one another, an identification code is able to be detected that encodes a position range in each case. However, the speed or the speed characteristic during the movement along the optical waveguide has to be taken into account in the decoding, which must therefore be determined as well.

The grating may have grating openings in the extension direction of the optical waveguide, which are set apart from one another, especially at regular intervals, and/or the grating has a first polarization filter so that the light that emerges from the grating and is radiated toward the sensor system is polarized and especially has a single polarization direction. This offers the advantage that the rotation of the second part with respect to the first part may be determined by the polarization filtering. If the grating openings are spaced apart at regular intervals, it is possible to determine the position.

The sensor system may have a first sensor for determining the light intensity and a second sensor for determining the light intensity, a second polarization filter being disposed between the first sensor and the grating on the second part, and a third polarization filter being disposed between the second sensor and the grating on the second part, the polarization direction of the second polarization filter having a non-zero angle of rotation with respect to the polarization direction of the third polarization filter, in particular an angle of rotation of 90°. This has the advantage that it is easy to determine the rotation of the second part relative to the first part.

The first, the second and the third polarization filters have a planar configuration and the planes accommodating the first, the second and the third polarization filters are aligned parallel to one another. This is considered advantageous inasmuch as the lowest possible measuring error is achievable in this manner.

The sensor system may have a third sensor for determining the light intensity in addition to the first and the second sensor, and no polarization filter may be situated between the optical waveguide and the third sensor. This offers the advantage that in addition to determining the rotation, i.e. the relative angle of rotation of the second part with respect to the first part, the position along the extension of the optical waveguide is able to be determined as well. Moreover, the third sensor is suitable for receiving data for a contact-free data transmission. Especially because a light intensity is able to be determined with the aid of the third sensor, a data reception of the data transmitted in a contact-free and especially intensity-modulated manner is also able to be carried out.

The light irradiated into the optical waveguide may be generated by a controllable light source, in particular, such that the intensity of the light irradiated into the optical waveguide is modulated according to a data flow generated by a data source. This is considered advantageous because the light is easily able to be modulated. For example, an LED may be used as the controllable light source.

The sensor signal generated by the third sensor may be demodulated by an evaluation unit, in particular by a modem, and forwarded to a data sink, in particular a signal-electronics system, especially a control, of the second part.

This offers the advantage that the unidirectional data transmission from the first part to the second part is able to be carried out in a contact-free manner, and the decoding is easily achievable.

The second part may be disposed so as to be rotatable in relation to the first part, or the second part may be movable relative to the first part in the direction of the optical waveguide guide installed in an elongated manner. This offers the advantage that the light guide is installable in a linear or a circular manner.

In this context, 'in an elongated manner' means that the optical waveguide extends over a great length. This not only encompasses an extension along a linear curve but also along a circular path whose diameter is much greater, i.e. especially at least one hundred times greater, in comparison with the diameter of the optical waveguide, i.e. the diameter of the conductor-cross section of the optical waveguide. 'Installed in an elongated manner' may therefore also mean 'installed along a circular path'.

The second part may be a driverless transport system. This has the advantage that the second part may be arranged as an automatically guided vehicle.

The surface of the optical waveguide may be roughened. This is considered advantageous insofar as the intensity of the laterally radiated light is able to be determined as a function of the degree of roughening.

The sensors may have at least one photodiode in each case. This offers the advantage that the light modulated by the controllable light source is easily detectable.

The normal of the plane that accommodates the first polarization filter may be aligned at a right angle to the polarization direction of the first polarization filter. This is considered advantageous insofar as the polarization direction of the first polarization filter has a fixed alignment.

Further features and aspects of example embodiments of the present invention are described in greater detail with reference to the Figures.

DETAILED DESCRIPTION

Figure 1:
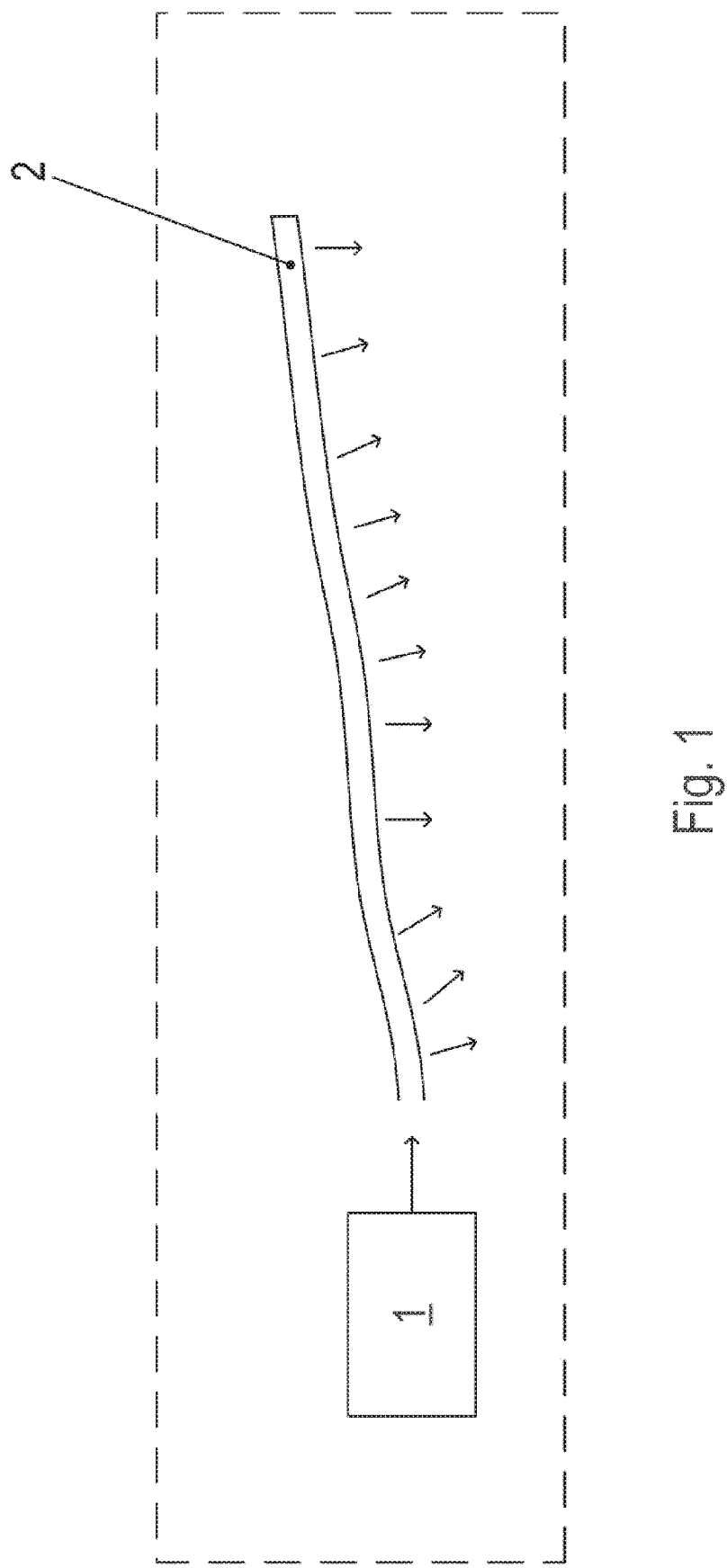
In FIG. 1, the stationary part of a system according to an example embodiment of the present invention, which has a laterally luminous optical waveguide 2, is schematically sketched.

As illustrated in FIG. 1, the light irradiated into an optical waveguide 2 by a light source 1 is able to be emitted at the side if the surface of optical waveguide 2 is roughened so that the reflection, especially the total reflection, of the light beams guided in optical waveguide 2 that occurs at the inner surface is reduced. The lateral radiation is shown with the aid of the arrows.

Figure 2:
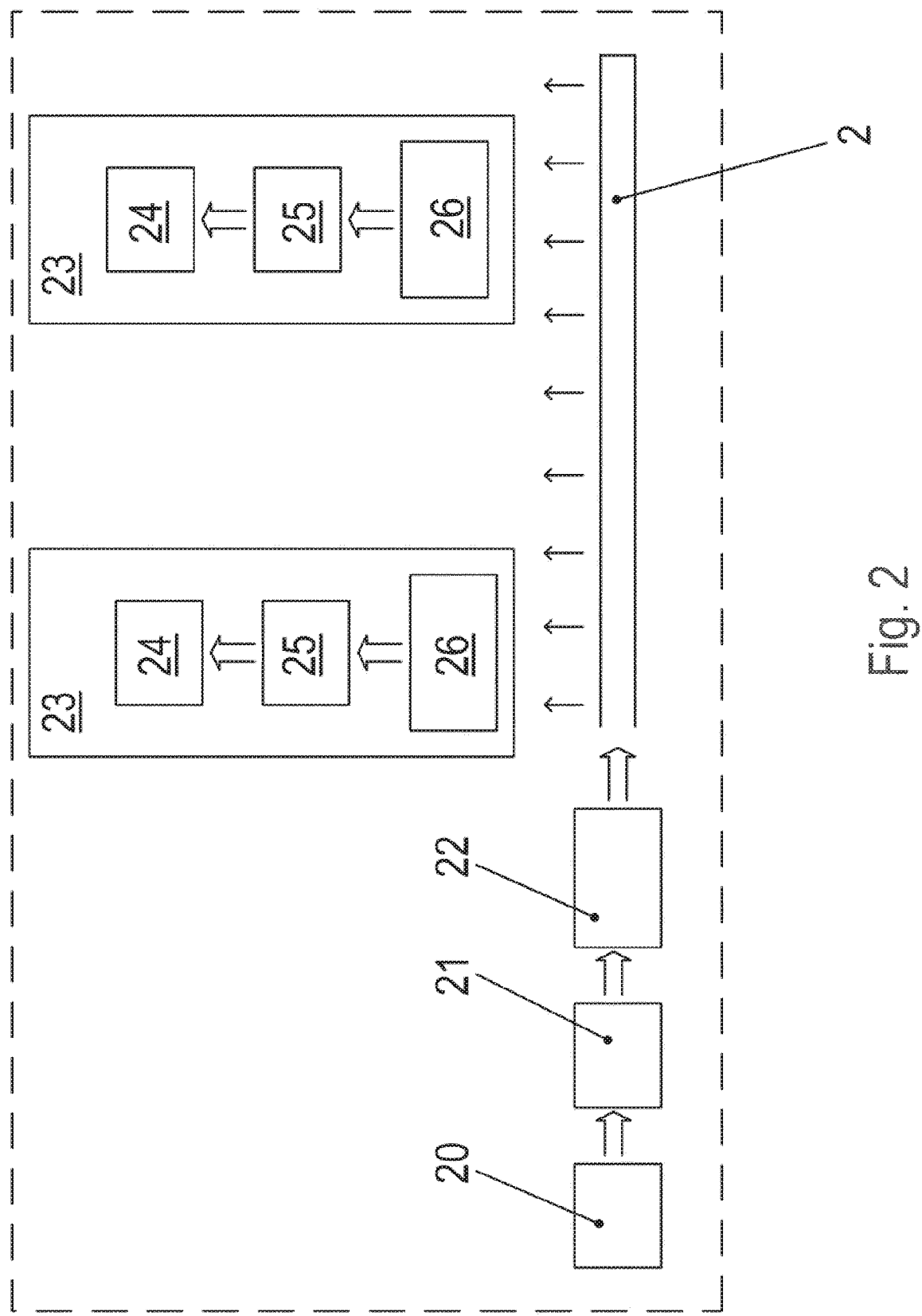
In FIG. 2, a system according to an example embodiment of the present invention, which has a stationary part and mobile components 23, in particular mobile components that are movable in a translatory manner, is schematically sketched.

As illustrated in FIG. 2, the laterally luminous optical waveguide is able to be moved in a system in an elongated fashion, and mobile components 23 are moving along the optical waveguide in the process.

Once again, the data transmitted by a data source 20, in particular a higher-level control, are conveyed to light source 22 via a modem 21, so that this light source 22 injects correspondingly modulated light into optical waveguide 2 with the result that this modulated light then laterally emitted from optical waveguide 2.

Mobile components 23 that are movable along optical waveguide 2 are provided with a light-sensitive sensor in each case, in particular a light receiver 26, whose sensor signals are forwarded to a modem 25, which demodulates and/or decodes the data so that the data are able to be conveyed to a data sink 24. The control of mobile component 23 may be provided as a data sink 24 by way of example. Using light that is radiated by optical waveguide 2 at the side, data are therefore transmittable from a central control of the system to the control of mobile component 23 in a contact-free manner.

Figure 3:
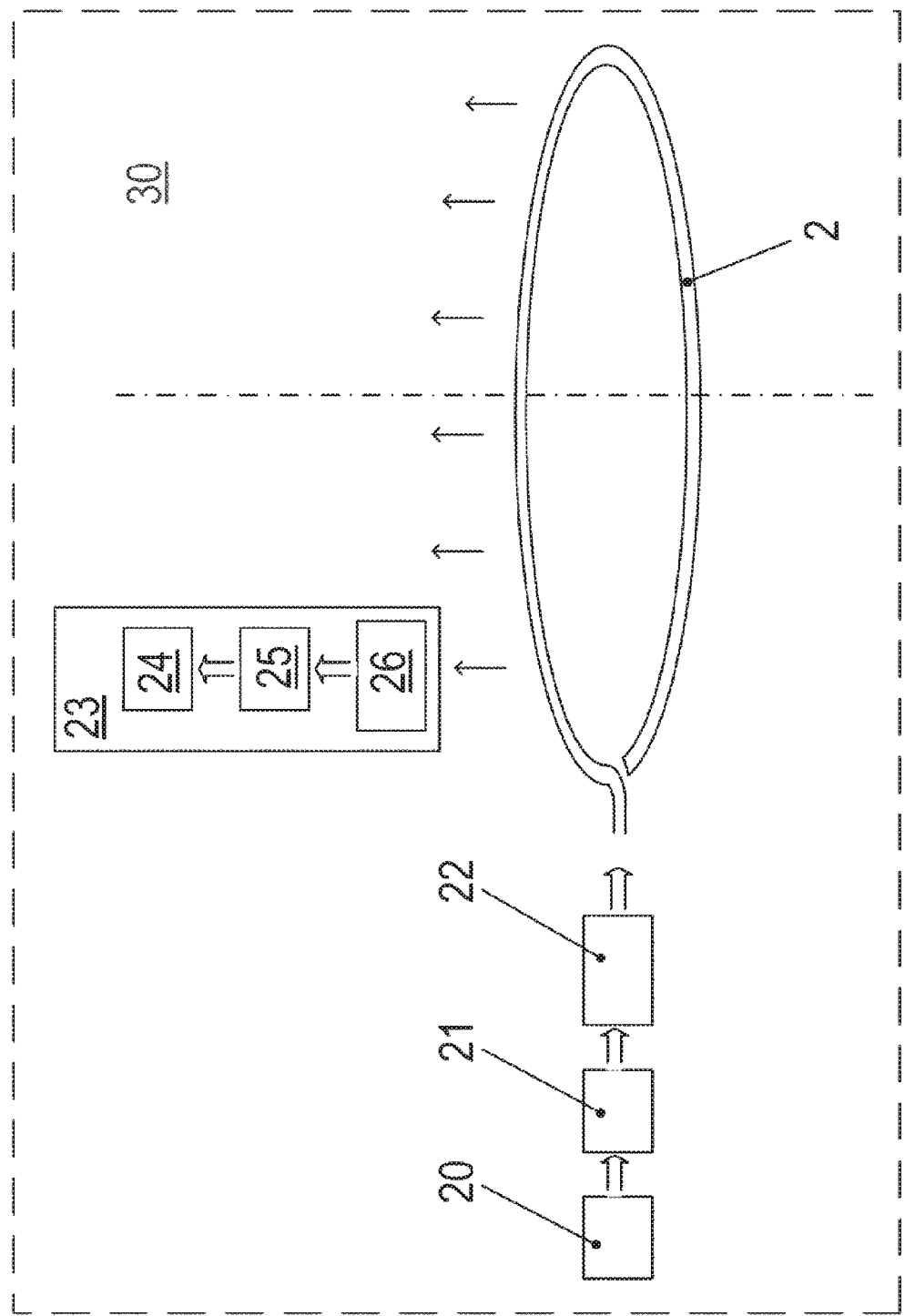
In FIG. 3, a rotatory system is schematically sketched.

As illustrated in FIG. 3, data are once again conveyed from a data source 20, in particular a higher-level control, to light source 22 via a modem 21 so that this light source 22 injects correspondingly modulated light into optical waveguide 2, this modulated light then being radiated by optical waveguide 2 at the side.

A light receiver 26, i.e. a light-sensitive sensor, which detects the light laterally radiated by optical waveguide 2, is disposed on part 23 of rotary joint 30 that is rotatably mounted with respect to the stationary part which includes light source 22, modem 21, and data source 20. The sensor signals generated light receiver 26 are conveyed to modem 25, which supplies the data flow that is decoded therefrom to data sink 24. In this instance, a signal-electronics system disposed on part 23 functions as data sink 24. As a result, a contact-free transmission of information to the rotatably mounted part is possible with the aid of the modulated light.

Figure 4:
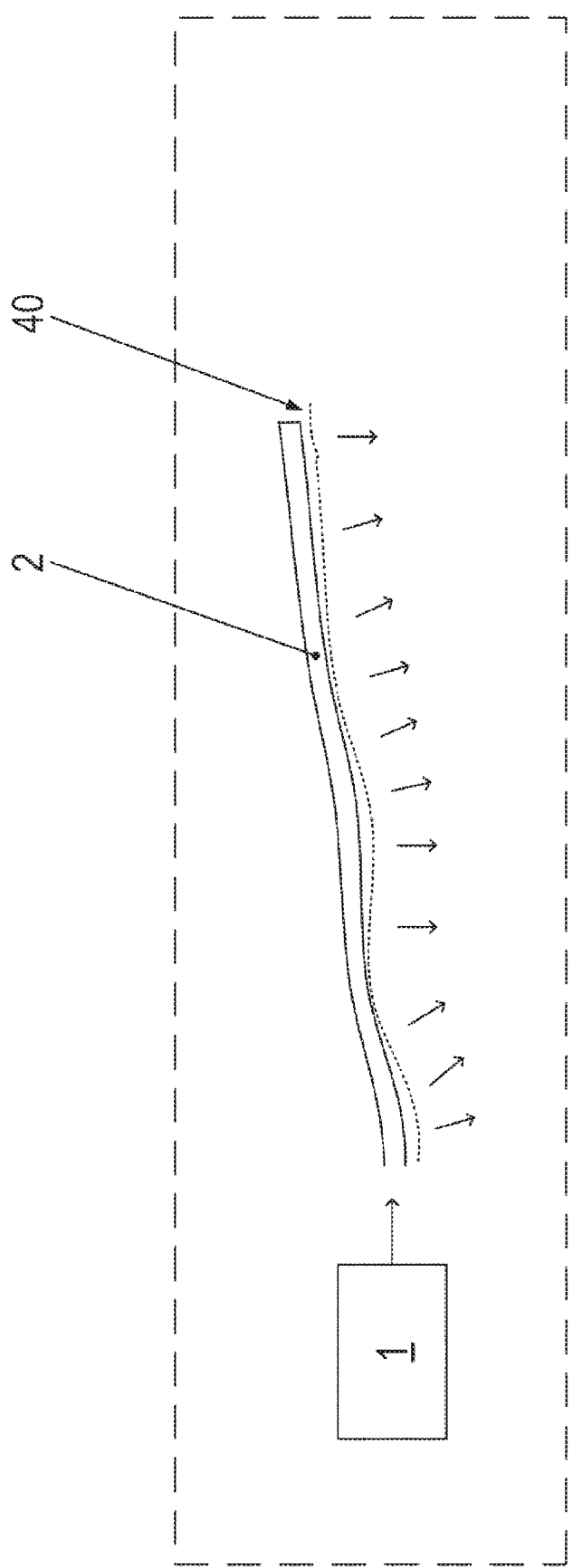
In FIG. 4, the stationary part of a system according an example embodiment of to the present invention, which has a laterally luminous optical waveguide 2, is schematically sketched, a grating 40 at least partially covering optical waveguide 2.

As illustrated in FIG. 4, laterally radiating optical waveguide 2 is at least partially covered by a grating 40. The lateral radiation along optical waveguide 2 is therefore irregular in accordance with the placement of the grating openings and is able to be used for encoding positional information. When grating 40 is arranged as a polarization grating, polarized light emerges and thereby makes it possible to determine the rotation of mobile component 23 with respect to the polarization plane. A combination of grating 40 having grating openings with polarization grating 40 disposed thereon is also possible so that mobile part 23 is capable of determining its rotation with respect to the polarization plane on the one hand, and the position along the trajectory defined by the optical waveguide on the other. The grating openings along the optical waveguide may be spaced apart from one another at regular intervals. The polarization foil is disposed such that the polarization plane along the optical waveguide is substantially aligned transversely to the optical waveguide. As an alternative, a longitudinal polarization direction, i.e. a polarization direction parallel to the optical waveguide, may also be used.

Figure 5:
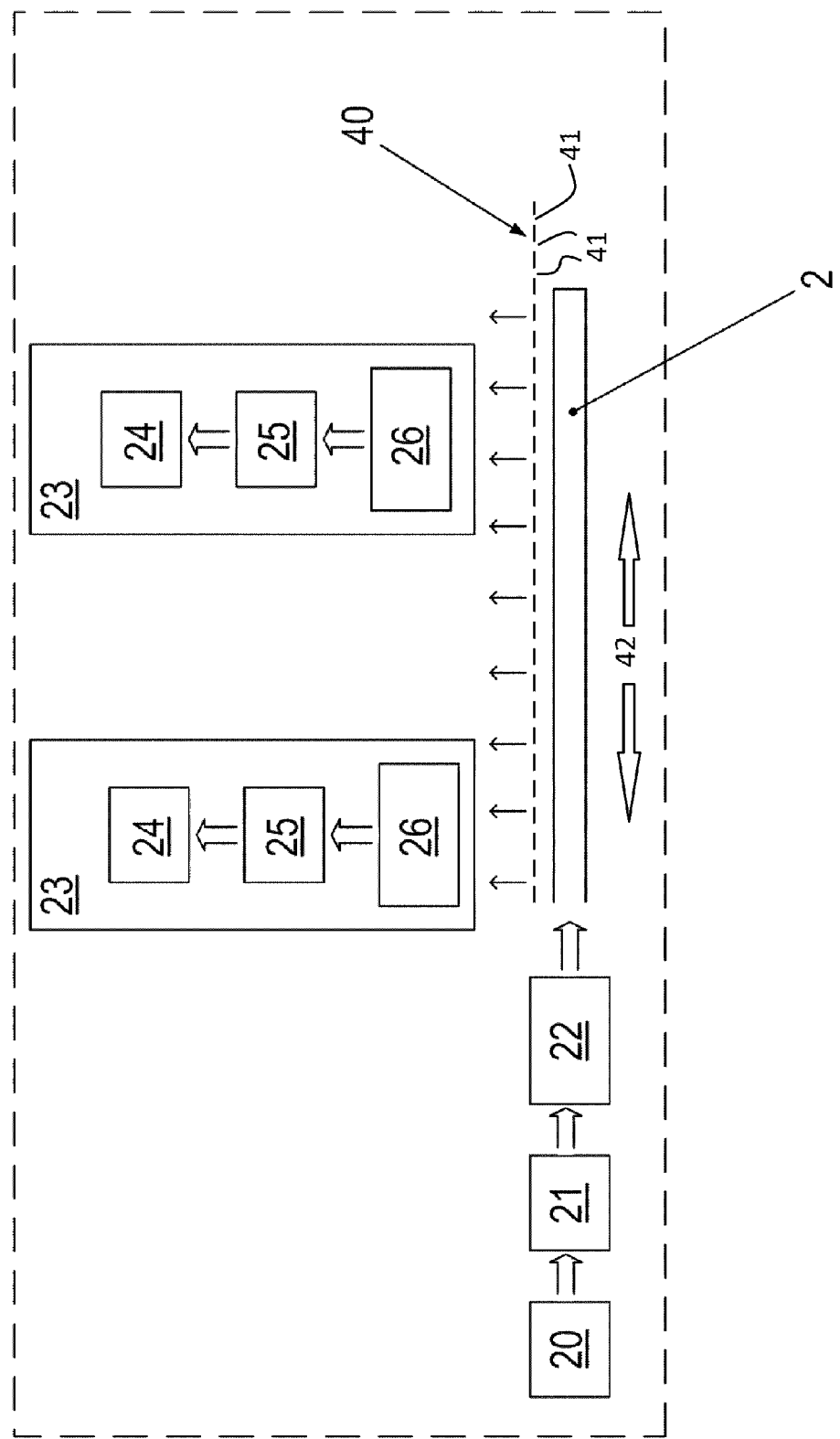
In FIG. 5, a grating 40 for the at least partial coverage of the laterally luminous optical waveguide 2 is shown in addition to the system illustrated in FIG. 2.

As illustrated in FIG. 5, the data transmitted from data source 20 to a modem 21 are in turn conveyed in the form of modulation signals to light source 22, which then injects the correspondingly modulated light into optical waveguide 2, which forwards the light and laterally radiates it through grating(s) 40. In this case, too, a polarization grating is provided as a grating 40, or a grating whose grating openings 41 make it possible to determine a position at least in a relative manner, i.e. by counting the grating openings 41 during the movement along optical waveguide 2. An extension direction is indicated by double-headed arrow 42.

FIG. 5 shows two mobile parts 23, which are movable along optical waveguide 2. As a result, a plurality of mobile parts 23 is able to be supplied with data from data source 20. Each mobile part 23 has a light receiver 26, i.e. a sensor that is sensitive to a light intensity. The output signal, i.e. the sensor signal, from sensor 26, is supplied to a modem 25 whose decoded data flow is conveyed to a data sink 24, i.e. a signal-electronics system of mobile part 23 acting as a control, in particular.

During the travel along optical waveguide 2, the intensity of the light received by sensor 26 varies according to the sequence of the grating openings of grating 40. This makes it possible to determine the position relative to an initial position. Data are able to be received, in particular at a time overlap, by demodulating the received modulated light.

If an additional polarization filter is available, it is also possible to determine the angle of rotation of respective mobile part 23 relative to the polarization plane of the polarization filter.

Figure 6:
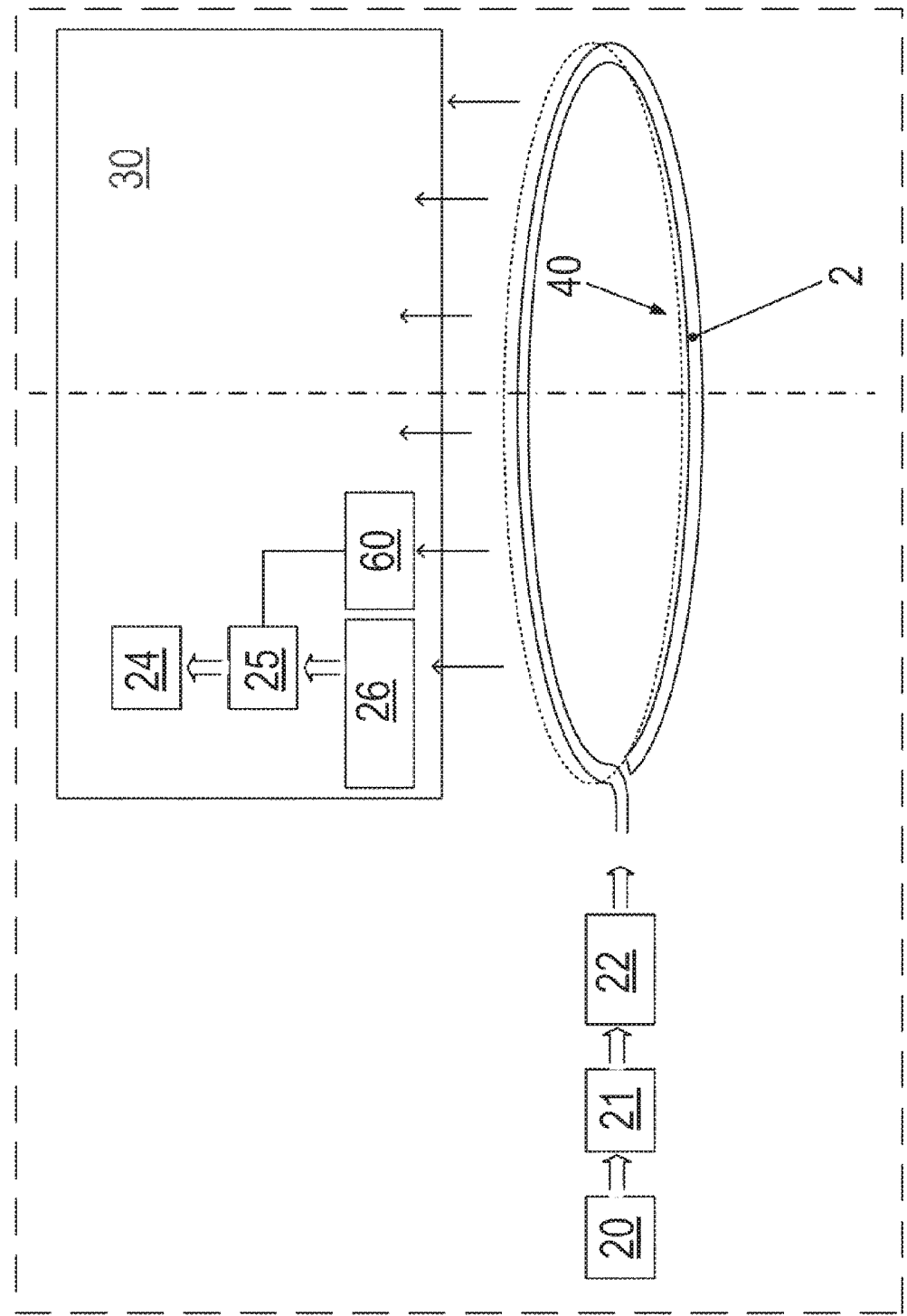
FIG. 6 shows a rotary joint 30 whose stationary part in turn an optical waveguide 2, which is installed in a circular manner and has a grating 40 for an at least partial coverage, light-sensitive sensors for the receiving of data and for determining the position being disposed on the part that is rotatable relative to the stationary part.

As illustrated in FIG. 6, it is also possible to provide a light-sensitive sensor 26, as in FIG. 5, for the receiving of data, and photodiodes 60, in particular a first photodiode and a second photodiode, in addition, the photo diodes being placed at an offset from one another in the direction of the line conductor, such that when mobile part 23 is moving at a constant speed, the signals from the two photodiodes have the same form and a mutual phase offset of 90° is present. This makes it possible to determine the position in an accurate manner.

Grating 40, which is disposed on optical waveguide 2 in FIG. 6, may be arranged in an annular form.

Figure 7:
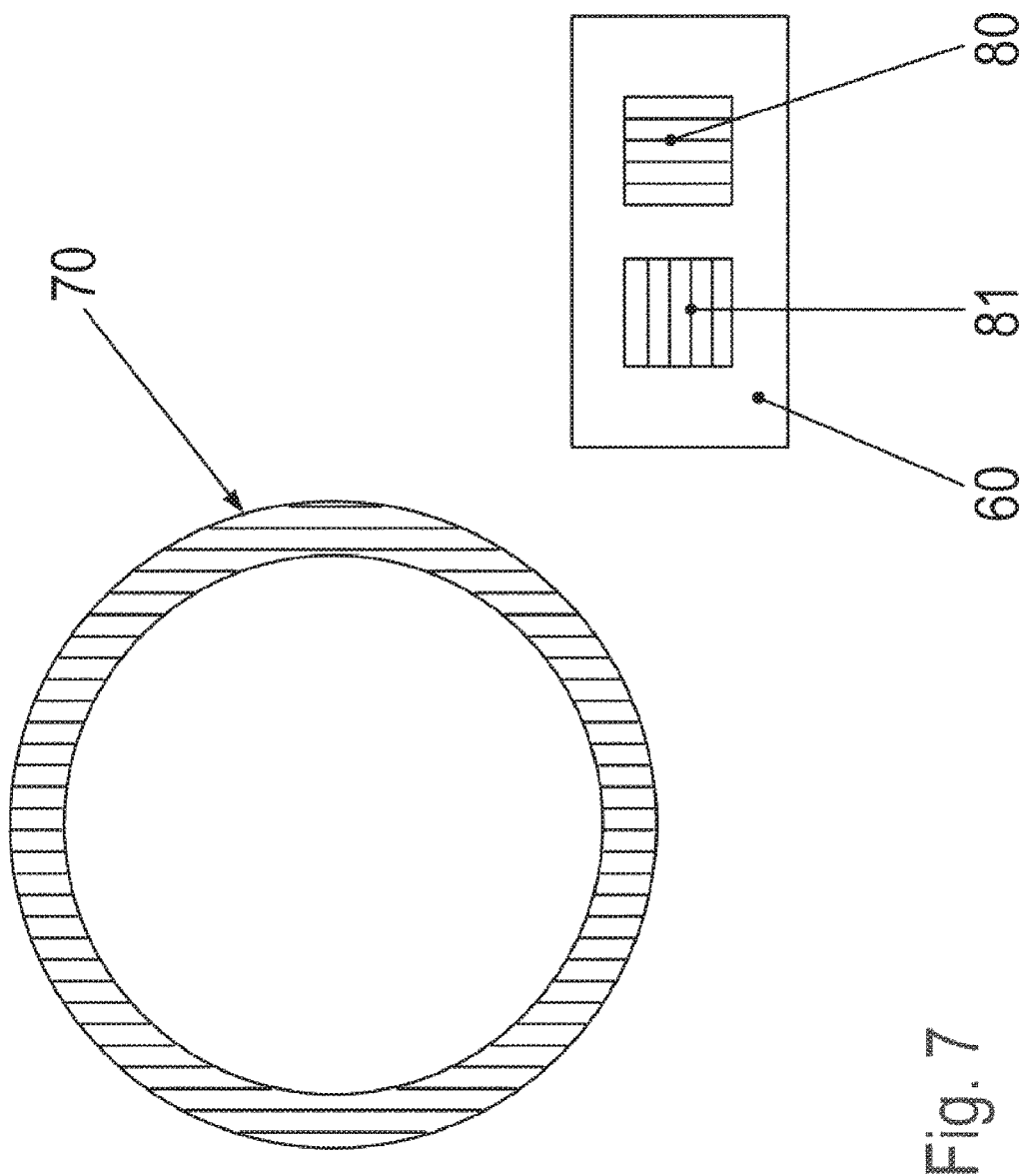
FIG. 7 schematically shows a polarization filter 70 as a grating 40 for rotary joint 30.

As illustrated in FIG. 7, this grating 40 may also be replaced by an annular grating 70 that is produced from a polarization foil. The polarization plane of polarization foil 70 produced in this manner, i.e. of first polarization filter 70, is aligned parallel to the axis of rotation throughout. As a result, light that has a single polarization direction as a whole is laterally emitted by the stationary part from the optical waveguide.

In contrast, a first polarization foil 80, i.e. a second polarization filter 80, is situated on the rotatably mounted part upstream from the aforementioned first photodiode, and a second polarization foil 81, i.e. a third polarization filter 80, is situated upstream from the second photodiode, the polarization plane of first polarization foil 80, and thus also the associated polarization direction, being rotated at an angle, in particular at 90° for example, relative to the polarization plane of second polarization foil 81, and thus also relative to the associated polarization direction. The first and the second polarization foils (80, 81) are situated in a planar manner in each case, and these two planes are not only situated parallel to each other but also parallel to the particular plane in which polarization foil 70 is situated.

Figure 8:
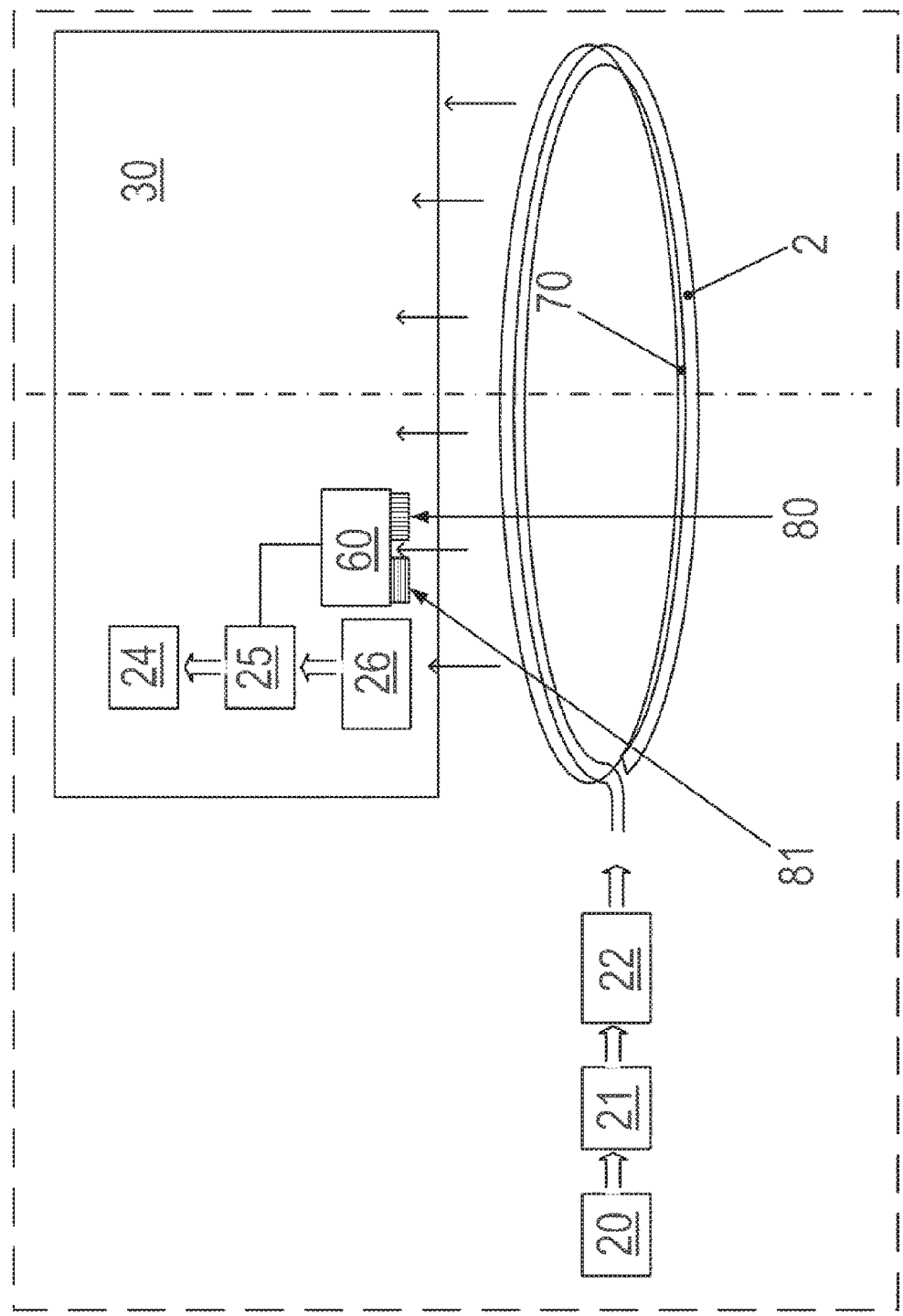
FIG. 8 schematically shows a rotary joint 30; disposed on the stationary part is a polarization filter 70 while a light-sensitive sensor 26 for the receiving of data, and light-sensitive sensors (60), in particular photodiodes, which are covered by a mutually rotated polarization foil, are in turn on the part that is rotatable relative to the stationary part.

As illustrated in FIG. 8, a corresponding ratio of the light intensities detected by the two photodiodes 60 is therefore obtainable as a function of the angle of rotation of the rotatable part relative to the stationary part. This makes it possible to bijectively determine the angle of rotation, at least in a circumferential-angle range of 180°. During the rotary motion of the rotatable part, the characteristic of, and/or the change in, the light intensities may be determined as well, thereby determining the angular position in a bijective manner, at least relative to an initial angular position.

The characteristic of the light intensities determined by the two angle sensors 60 at a uniform rotary motion of the rotatable part relative to the stationary part has a mutual phase offset of 90°.

LIST OF REFERENCE NUMERALS 1 light source
2 laterally luminous optical waveguide
20 data source
21 modem
22 light transmitter
23 mobile part
24 data sink
25 modem
26 light receiver
30 rotary joint
40 grating, in particular polarization filter or position-encoded grating
41 grating openings
42 extension direction
60 photodiodes, in particular first photodiode and second photodiode
70 polarization filter
80 second polarization filter
81 third polarization filter

The invention claimed is:
1. A system, comprising:
an elongated optical waveguide having a lateral side and adapted to radiate light laterally from the lateral side;
at least one sensor system adapted to detect light intensity of the light radiated laterally from the lateral side of the elongated optical waveguide;
a grating arranged between the sensor system and the elongated optical waveguide;
wherein the grating includes (a) grating openings in an extension direction of the elongated optical waveguide, (b) grating openings that are spaced apart from one another at regular intervals, and/or (c) a first polarization filter adapted to polarize light emerging from the grating and being radiated in a direction of the sensor system, and has a single polarization direction;
wherein the sensor system includes a first sensor adapted to determine light intensity and a second sensor adapted to determine light intensity, a second polarization filter being arranged between the first sensor and the grating, a third polarization filter being arranged between the second sensor and the grating, a polarization direction of the second polarization filter having a non-zero angle of rotation with respect to the polarization direction of the third polarization filter and/or an angle of rotation of 90°;

wherein the sensor system includes a third sensor adapted to determine light intensity and to receive data for a contact-free data transmission; and wherein no polarization filter is disposed between the optical waveguide and the third sensor.

2. The system according to claim 1, wherein the sensor system is moveable along the elongated optical waveguide and light that is laterally radiated from the elongated optical waveguide impinges upon the sensor system.

3. The system according to claim 1, wherein the first, the second, and the third polarization filters have a planar configuration and are aligned parallel to one another.

4. The system according to claim 1, wherein light irradiated into the elongated optical waveguide is generated by a controllable light source, intensity of the light irradiated into the elongated optical waveguide being modulated according to a data flow generated by a data source.

5. The system according to claim 1, further comprising an evaluation unit and/or a modem adapted to demodulate a sensor signal generated by the third sensor is demodulated by an evaluation unit and to convey the demodulated sensor signal to a data sink, a signal-electronics system, and/or a control of the second part.

6. The system according to claim 1, wherein the sensor system is rotatable relative to the elongated optical waveguide and the grating, and/or the sensor system is movable relative to the elongated optical waveguide and the grating in a direction of the elongated optical waveguide and/or along a circular path having a diameter at least one hundred times greater than a diameter of a cross-section of the elongated optical waveguide.

7. The system according to claim 1, wherein a surface of the elongated optical waveguide is roughened.

8. The system according to claim 1, wherein each sensor includes at least one photodiode.

9. The system according to claim 1, wherein a normal of the plane accommodating the first polarization filter is aligned at a right angle to the polarization direction of the first polarization filter.

10. A system, comprising:
an elongated optical waveguide having a lateral side and adapted to radiate light laterally from the lateral side; and
at least one sensor system adapted to detect light intensity of the light radiated laterally from the lateral side of the elongated optical waveguide;
a grating arranged between the sensor system and the elongated optical waveguide;
wherein the sensor system has a first sensor adapted to determine light intensity and a second sensor adapted to determine light intensity, a second polarization filter being arranged between the first sensor and the grating, a third polarization filter being arranged between the second sensor and the grating, a polarization direction of the second polarization filter having a non-zero angle of rotation with respect to the polarization direction of the third polarization filter and/or an angle of rotation of 90°.

11. The system according to claim 10, wherein the first, the second, and the third polarization filters have a planar configuration and are aligned parallel to one another.

12. The system according to claim 10, wherein the sensor system includes a third sensor adapted to determine light intensity, and no polarization filter is arranged between the elongated optical waveguide and the third sensor.

13. The system according to claim 12, further comprising an evaluation unit and/or a modem adapted to demodulate a sensor signal generated by the third sensor is demodulated by an evaluation unit and to convey the demodulated sensor signal to a data sink, a signal-electronics system, and/or a control of the second part.

14. The system according to claim 11, wherein a normal of the plane accommodating the first polarization filter is aligned at a right angle to the polarization direction of the first polarization filter.

15. A system, comprising:
an elongated optical waveguide having a lateral side and adapted to radiate light laterally from the lateral side;
at least one sensor system adapted to detect light intensity of the light radiated laterally from the lateral side of the elongated optical waveguide; and
a grating that is arranged between the sensor system and the elongated optical waveguide;
wherein the sensor system is rotatable relative to the elongated optical waveguide and the grating, and/or the sensor system is movable relative to the elongated optical waveguide and the grating in a direction of the elongated optical waveguide and along a circular path having a diameter at least one hundred times greater than a diameter of a cross-section of the elongated optical waveguide.

* * * * *